(12) United States Patent
Dhir et al.

(10) Patent No.: US 7,142,557 B2
(45) Date of Patent: Nov. 28, 2006

(54) PROGRAMMABLE LOGIC DEVICE FOR WIRELESS LOCAL AREA NETWORK

(75) Inventors: Amit Dhir, San Jose, CA (US); Krishna Rangasayee, Pleasanton, CA (US)

(73) Assignee: Xilinx, Inc., San Jose, CA (US)

( * ) Notice: Subject to any disclaimer, the term of this patent is extended or adjusted under 35 U.S.C. 154(b) by 961 days.

(21) Appl. No.: 10/007,841

(22) Filed: Dec. 3, 2001

(65) Prior Publication Data

US 2005/0084076 A1    Apr. 21, 2005

(51) Int. Cl.
*H04L 12/66* (2006.01)
(52) U.S. Cl. .......................... 370/463; 716/17
(58) Field of Classification Search ............ 370/469, 370/445, 442, 310, 336, 337, 345; 716/305, 716/313, 315
See application file for complete search history.

(56) References Cited

U.S. PATENT DOCUMENTS

| | | | | |
|---|---|---|---|---|
| 5,588,121 A * | 12/1996 | Reddin et al. | ................. | 712/29 |
| 5,636,140 A * | 6/1997 | Lee et al. | .................... | 370/469 |
| 6,212,190 B1 * | 4/2001 | Mulligan | .................... | 370/400 |
| 6,408,347 B1 * | 6/2002 | Smith et al. | ................... | 710/36 |
| 6,480,477 B1 * | 11/2002 | Treadaway et al. | ......... | 370/314 |
| 6,526,264 B1 * | 2/2003 | Sugar et al. | ................... | 455/84 |
| 6,795,881 B1 * | 9/2004 | Bachrach | .................... | 710/100 |
| 6,847,654 B1 * | 1/2005 | Zegelin | ....................... | 370/463 |
| 2001/0010689 A1 * | 8/2001 | Awater et al. | .............. | 370/344 |
| 2002/0034189 A1 * | 3/2002 | Haddock et al. | ............ | 370/423 |
| 2002/0094087 A1 * | 7/2002 | Dellmo et al. | .............. | 380/270 |
| 2002/0101848 A1 * | 8/2002 | Lee et al. | .................... | 370/349 |
| 2003/0163298 A1 * | 8/2003 | Odom et al. | .................. | 703/21 |

OTHER PUBLICATIONS

Carl Carmichael et al.; XAPP216 (v1.0); "Correcting Single-Event Upsets Through Virtex Partial Configuration"; Jun. 1, 2000; available from Xilinx, Inc., 2100 Logic Drive, San Jose, California 95124; pp. 1-12.
U.S. Appl. No. 09/915,707, filed Jul. 25, 2001, Dhir et al.
U.S. Appl. No. 10/007,842, filed Dec. 3, 2001, Dhir et al.

\* cited by examiner

*Primary Examiner*—Chi Pham
*Assistant Examiner*—Thien D. Tran
(74) *Attorney, Agent, or Firm*—W. Eric Webostad; Kim Kanzaki

(57) ABSTRACT

Method and apparatus for a wireless local area network programmable logic device is described. More particularly, a field programmable gate array (FPGA) is coupled to memory having programming instructions for configuring the FPGA with a medium access layer selected from more than one type of medium access layers. A physical layer is hardwired or embedded on the FPGA, or a separate integrated circuit for the physical layer is used. Additionally, the memory comprises programming instructions for a baseband controller, and may include programming instructions for a baseband processor, for configuring the FPGA in accordance therewith. In this manner, a single physical layer may be used with an FPGA to provide a multi-platform application specific standard product (ASSP). This is especially advantageous for providing multi-platform devices for use in countries or applications where one or more standards may be employed.

15 Claims, 10 Drawing Sheets

PROGRAMMABLE LOGIC DEVICE FOR WIRELESS LOCAL AREA NETWORK

BACKGROUND OF THE INVENTION

1. Field of the Invention

The present invention relates generally to programmable logic devices, and more particularly to programmable logic devices configured for wireless communication.

2. Description of the Related Art

Programmable logic devices exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic devices, called a field programmable gate array (FPGA), is very popular because of a superior combination of capacity, flexibility and cost. An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are typically programmed by loading a stream of configuration data (bitstream) into internal configuration memory cells that define how the CLBs, IOBs, and interconnect structure are configured. The configuration bitstream may be read from an external memory, conventionally an external integrated circuit memory EEPROM, EPROM, PROM, and the like, though other types of memory may be used. The collective states of the individual memory cells then determine the function of the FPGA.

Even though FPGAs are very flexible and can be used to implement many circuits, they have some performance limitations, such as longer signal delays and lower gate counts. These limitations hinder use of FPGAs on high-speed communication applications, namely, those communication applications with real-time processing of information. For these applications, application specific integrated circuits (ASICs) are generally used.

Unfortunately, communication circuits implemented as ASICs have several disadvantages. One such disadvantage is the time-to-market risks associated with the relatively long cycle time necessary for the implementation of a new ASIC design. An additional disadvantage of using ASICs for communication circuits is that ASICs are "hardwired" and thus conventionally are not reconfigurable for a new application or application upgrade.

Wireless Local Area Network (WLAN) radio technology comprising IEEE 802.11a and HiperLAN2 are two forms of next generation communication. The physical layer of both IEEE 802.11a and HiperLAN2 technologies is the same, namely, Orthogonal Frequency Division Multiplex (OFDM). However, the data link layer of each of these technologies is different. The data link layer comprises the medium access control (MAC) and logical link control layers. The physical layer defines electrical, mechanical and procedural specifications, which provide transmission of bits over a communication medium or channel. WLAN physical layer technologies include narrowband radio, spread spectrum and, with reference to the above-identified LAN technologies, OFDM. The logical link layer ensures error control and synchronization between physically connected devices communicating over a channel, and ensures priority determinations and allocations for access to such channel.

Both IEEE 802.11a and HiperLAN2 use a 5 GHz ISM (Industrial, Scientific, Medical) band. However, unknown future unification to a single standard, namely, either IEEE 802.11a or HiperLAN2, is causing concern among those deciding on which version of OFDM to implement in their products. In addition, nonconformance to a single standard is hampering benefits associated with economies of scale.

Accordingly, it would be desirable and advantageous to have available a programmable logic device which is capable of implementing either IEEE 802.11a or HiperLAN2.

SUMMARY OF THE INVENTION

Programmability facilitates interfacing to other interfaces, while a having a common interface hardwired or embedded facilitates communication between systems. Examples of hardwired interfaces include USB 1.1, USB 2.0, IEEE 1394, Ethernet, IEEE 802.11a and HiperLAN2, among others. A hardwired interface may exist outside of and/or internal to an FPGA, where such an FPGA may be programmed as a medium access control layer. Moreover, such an FPGA may be programmed as an interface layer between such a medium access control layer and a physical layer. For example, between Ethernet physical and medium access control layers conventionally there is a MII (Media Independent Interface). This facilitates user access to such an interface through programming an FPGA.

The present invention provides method and apparatus for a programmable integrated circuit that can be used to handle different communication specifications. More particularly, an aspect of the present invention is a subsystem for use in a wireless local area-networking device. The subsystem comprises of transceiver coupled to programmable gates. Memory is coupled to the programmable dates for storing instructions for programming a first portion of the programmable gates with a selected one of a first type of a medium access layer and a second type of a medium access layer. The first type of the medium access layer is different from the second type of medium access layer, though both the first type of the medium access layer and the second type of the medium access layer are compatible with the transceiver. The memory is configured for storing instructions for programming a second portion of the programmable gates as a baseband controller. Another aspect of the present invention is the aforementioned subsystem wherein the second portion of the programmable gates is further programmed as a baseband processor.

Another aspect of the present invention is a circuit board comprising a field programmable gate array. The field programmable gate array comprises configuration logic blocks and programmable input/output blocks. A radio is coupled to the programmable configuration logic blocks through the programmable input/output blocks. Program memory is coupled to the programmable configuration logic blocks through the programmable input/output blocks. Data memory is coupled to the programmable configuration logic blocks through the programmable input/output blocks. An interface transceiver is coupled to the programmable configuration logic blocks through the programmable input/output blocks. The program memory comprises programming instructions for the programmable configuration logic blocks to be configured as a radio interface and controller, a medium access control protocol engine and configuration controller, and a baseband processor interface.

Another aspect of the present invention is a method for providing a multi-platform wireless local area network. More particularly, a radio is provided along with programmable input/output blocks coupled thereto. Configuration logic blocks coupled to the programmable input/output blocks are provided. A plurality of medium access control layers compatible with the radio and configured to program the configuration logic blocks are stored. A first portion of the configuration logic blocks is selectively programmed with a medium access control layer from the plurality of medium access control layers. Another aspect of the present invention is the above method further comprising storing a plurality of encryption algorithms configured to program the configuration logic blocks, and selectively programming a second portion of a configuration logic blocks with an encryption algorithm selected from the plurality of encryption algorithms.

Another aspect of the present invention is a circuit board comprising transceiver means for receiving and transmitting information, and comprising configurable logic means coupled to the transceiver means for communication therewith. The configurable logic means are for programming as a medium access control layer selected from a plurality of medium access control layers.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The present invention relates generally to programmable logic devices, and more particularly to programmable logic devices configured for wireless communication. In the following description, numerous specific details are set forth in order to provide a more thorough understanding of the present invention. However, it will be apparent to one skilled in the art that the present invention may be practiced without one or more of these specific details. In other instances, well-known features have not been described in detail in order to avoid obscuring the present invention.

Figure 1:
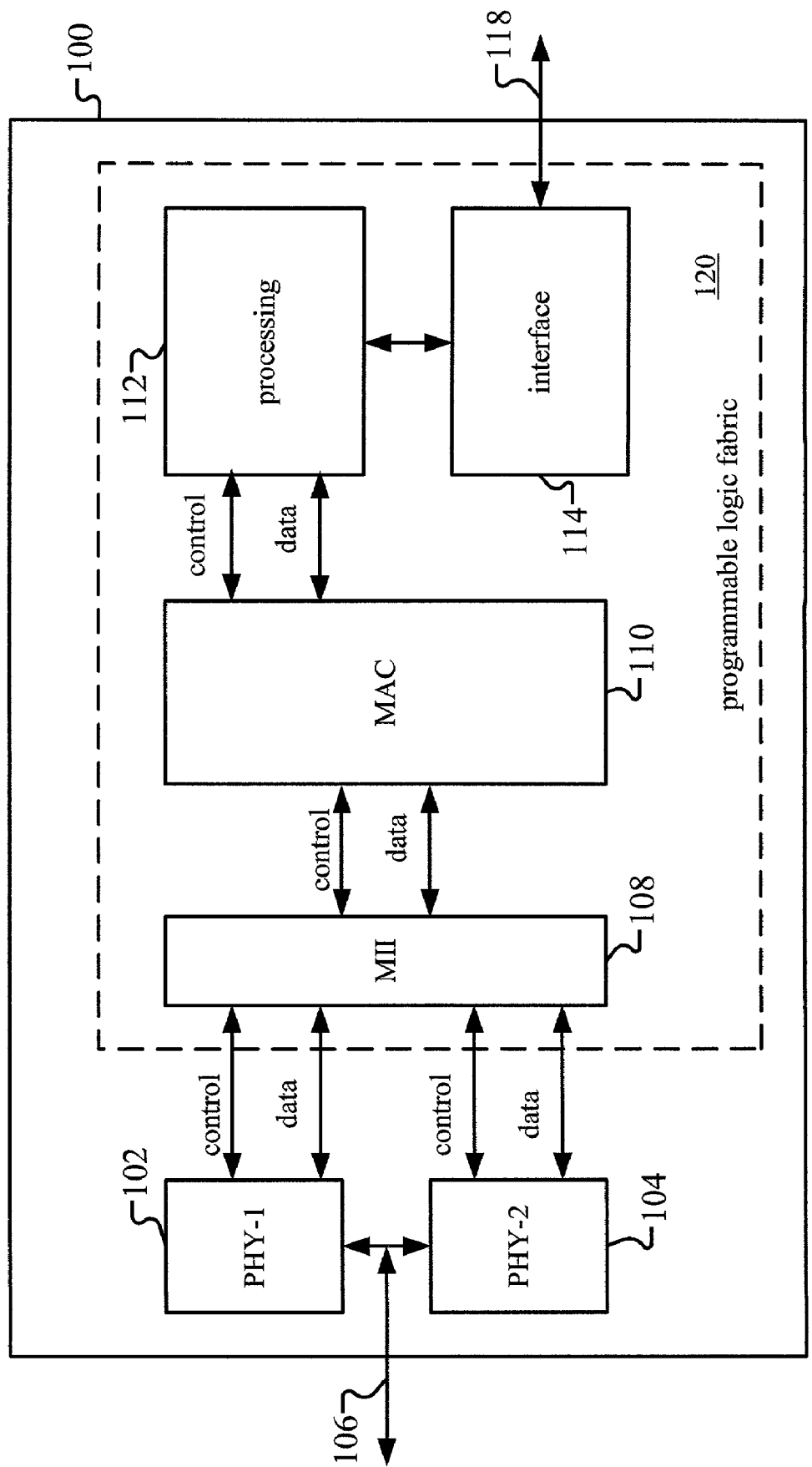
FIG. 1 is a block diagram of an exemplary embodiment of a communication integrated circuit in accordance with one or more aspects of the present invention.

FIG. 1 is a block diagram of a communication integrated circuit 100 of the present invention. Integrated circuit 100 contains two physical layer (PHY) components (102 and 104) that are connected to a signal line 106. Signal line 106 provides a communication link between integrated circuit 100 and external data of a physical medium. Each PHY communicates with a media independent interface (MII) component 108 through a control and a data line. MII 108 is connected to a media access control (MAC) component 110. MAC 110 is connected to processing component 112, which is in turn connected to an interface component 114. Interface component 114 is connected to a signal line 118. Signal line 118 is connected to an external device (not shown), such as a universal serial bus (USB) compatible device.

In integrated circuit 100, signal lines 106 and 118 are bi-directional lines receiving data from and delivering data to external sources. In the present invention, the data on signal line 106 conforms to a predetermined specification. One example is the HomePNA 2.0 specification, which is supported by the Home Phoneline Networking Alliance. This specification provides for data communication using regular telephone lines. Another example is the 10 Mbps Ethernet (IEEE 802.3) specification, which is supported by International Electrical and Electronic Engineers (IEEE). This specification provides for data communication between a plurality of devices on shared wires. A PHY interacts with a physical medium that conforms to one of these specifications. MII component 108 provides a common interface specification so that different PHYs can easily communicate with other components in integrated circuit 100. MAC component 110 is concerned with media access issues, such as whether token passing or contention will be used. It typically includes authentication and encryption functionalities. The MAC is a sub-layer of the "data link control," which is defined by the IEEE as the lower portion of the OSI reference model data link layer. The data to and from the MAC is processed by processing component 112. For example, processing component 112 is used to implement higher layers of the reference model. Interface component 114 provides the physical signal and software drivers for integrated circuit 100 to interact with an external device in accordance with a predetermined protocol (such as USB and IEEE 1394).

In one embodiment of integrated circuit 100, PHY 102 and 104 are fixed logic components embedded into a programmable logic fabric 120. Fixed logic components allow high speed processing of data. This is useful for implementing the physical layers because they need to process tremendous amount of raw data in and out of the physical medium. The rest of the components (i.e., MII 108, MAC 110, processing component 112, and interface component 114) are preferably implemented using a programmable logic fabric 120. One advantage is that any change in specifications of these components can be implemented easily in the environment of a programmable logic fabric.

In this embodiment, two PHY components and one MAC components are present in integrated circuit 100 (but note that more than two PHY components may be present if there is a need to do so). Each of the PHY components is able to process data in accordance with a predetermined protocol. For example, PHY 102 may conform to the HomePNA 2.0 specification while PHY 104 may confirm to the 10 Mbps Ethernet (IEEE 802.3) specification. It is observed that these two specifications define a MAC that is substantially the same. This observation is especially important in an implementation using field programmable gate array (FPGA). This is because FPGA allows a small portion of its programmable fabric to be changed without affecting the rest of the programmable fabric. This process is called "partial reconfiguration." An example of partial reconfiguration is disclosed in an application note published in June, 2000, by Xilinx, Inc., the assignee of the present invention, as "Correcting Single-Event Upsets Through Virtex Partial Configuration." As a result, the portion of MAC that is common to both specifications does not need to be changed after configuration. Only a small portion specific to each specification needs to be changed when integrated circuit 100 is switched from HomePNA to Ethernet. Alternatively, the specific portions of both specifications are placed in integrated circuit 100. The appropriate portion is used after a specification is selected (e.g., by setting a switch). Because the size of each specific portion is small, this method will not use too much resource of the integrated circuit.

Figure 2:
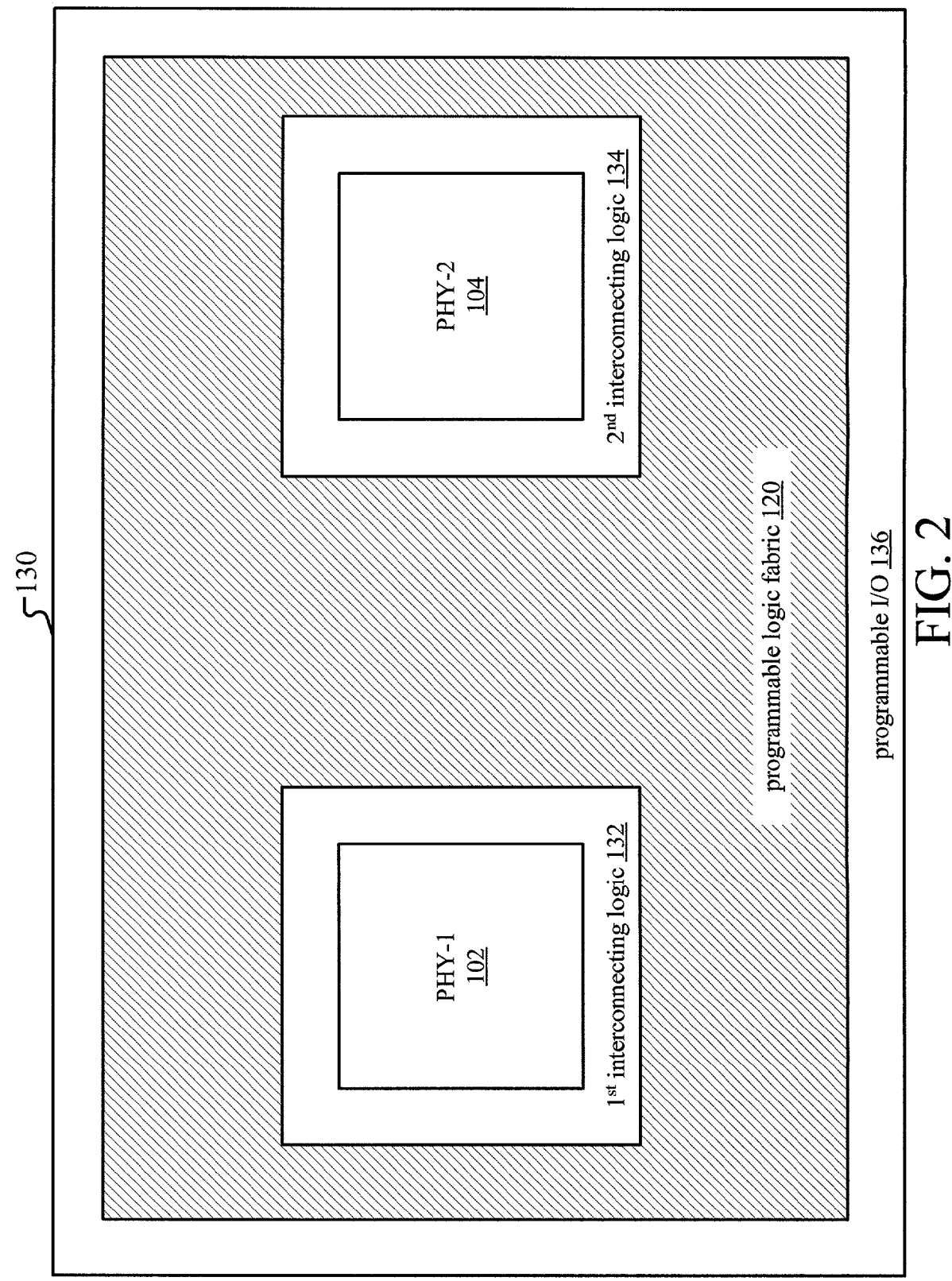
FIG. 2 is a block diagram of an exemplary embodiment of an FPGA that may be used to implement the communication integrated circuit of FIG. 1 in accordance with one or more aspects of the present invention.

Implementation details of integrated circuit 100 using an FPGA 130 are shown in FIG. 2. Common elements in FIGS. 1 and 2 have common reference numerals. In this exemplary implementation, PHYs 102 and 104 are spaced apart so that a common programmable logic fabric can be used to implement MII 108 and MAC 110. As mentioned before, PHYs 102 and 104 are fixed logic components (i.e., not implemented using programmable logic fabric elements). A connection logic layer (such as first connection logic layer 132 and second connection logic layer 134) is used to provide transition from a fixed logic component to the programmable logic fabric. FPGA 130 also has a plurality of programmable IOBs 136. Some of these IOBs can be used to carry signals 106 and 118 of FIG. 1.

Figure 3:
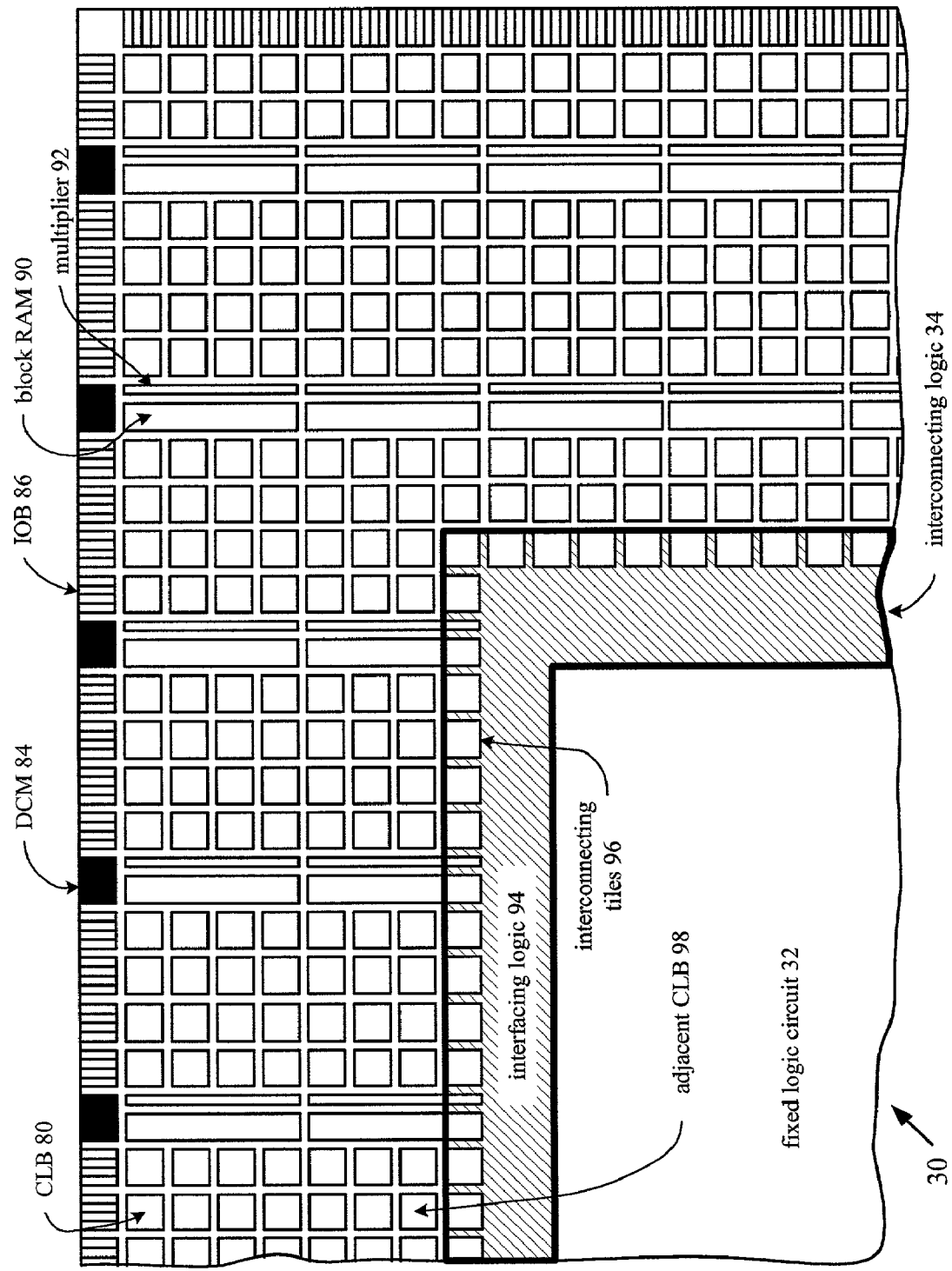
FIG. 3 is a schematic diagram of an exemplary embodiment of a portion of an FPGA containing a PHY component, programmable logic fabric, and the connection logic in accordance with one or more aspects of the present invention.

A detailed description of one of the connection logic layers is now provided. FIG. 3 shows one section 30 of integrated circuit 100. As shown in FIG. 3, a programmable logic fabric 12 includes a plurality of CLBs 80, a plurality of memory blocks (block RAM) 90, and a plurality of multipliers 92. Programmable I/O block section 14 includes a plurality of individual IOBs 86 and a plurality of digital clock managers (DCM) 84. The operations of CLBs 80, DCMs 84, IOBs 86, block RAM 90, and multipliers 92 function in a similar manner as corresponding components found in the X4000E family of field programmable gate arrays and/or the Virtex-II field programmable gate arrays designed and manufactured by Xilinx, Inc.

As shown, CLBs 80, block RAM 90 and multipliers 92 are arranged in a series of rows and columns. To embed a fixed logic circuit 32, programmable logic fabric 12 of CLBs 80, block RAM 90, and multipliers is essentially by way of analogy to "cut to make a hole" for the insertion of the fixed logic circuit and its corresponding interconnecting logic 34. As such, fixed logic circuit 32 and interconnecting logic 34 replace a set of configurable logic blocks 80, a set of memory blocks 90, and/or a set of multipliers 92.

With "a hole cut" in the programmable logic fabric, typical operation of the FPGA would be interrupted. This interruption occurs as a result of a programming interdependency between the plurality of configurable logic blocks 80, block RAMs 90, and multipliers 92.

The interconnecting logic 34 includes a plurality of interconnecting tiles 96 and may further include interfacing logic 94. The interconnecting tiles 96 provide connectivity between the interfacing logic 94, when included, and fixed logic circuit 32 with the plurality of CLBs 80, block RAM's 90 and/or multipliers 92 of the programmable logic fabric 12.

Interfacing logic 94 conditions data transfers between fixed logic 32 and CLBs 80, block RAM 90 and/or multipliers 92 of the programmable logic fabric. Such conditioning is dependent upon the functionality of fixed logic circuit 32. For example, if fixed logic circuit 32 processes video and/or audio signals in the analog domain, interfacing logic 94 would include analog to digital converters and digital to analog converters. If fixed logic circuit 32 is a microprocessor, the interfacing logic conditions the data to access control buses, address buses, and/or data buses of the microprocessor. In addition, interfacing logic 94 may include test circuitry for testing the embedded fixed logic circuit and the surrounding programmable logic fabric.

A different architecture of a communication integrated circuit 200 is now described. Integrated circuit 200 contains one PHY component 202 connected to a signal line 206. Signal line 206 provides a communication link between integrated circuit 200 and external data of a physical medium. PHY component 202 is connected to two MAC components 204 and 206. When integrated circuit is in operation, only one MAC is used. MAC 204 and 206 are connected to a processing component 212, which is in turn connected to an interface component 214. Interface component 214 is connected to signal line 218, which is connected to an external device (not shown).

In this architecture, MAC components 204 and 206 have very little in common. Thus, the above-mentioned partial reconfiguration may not present many advantages in this case. Consequently, both MAC components are pre-installed in integrated circuit 200.

In this embodiment, a PHY component 202 is preferably a fixed logic component embedded into a programmable logic fabric. The other components, such as the MAC components 204 and 206, processing component 212, and interface component 214, can be implemented using programmable logic fabric 220. It should be noted that any number of MACs might be installed in integrated circuit 200, depending on its size.

Figure 4:
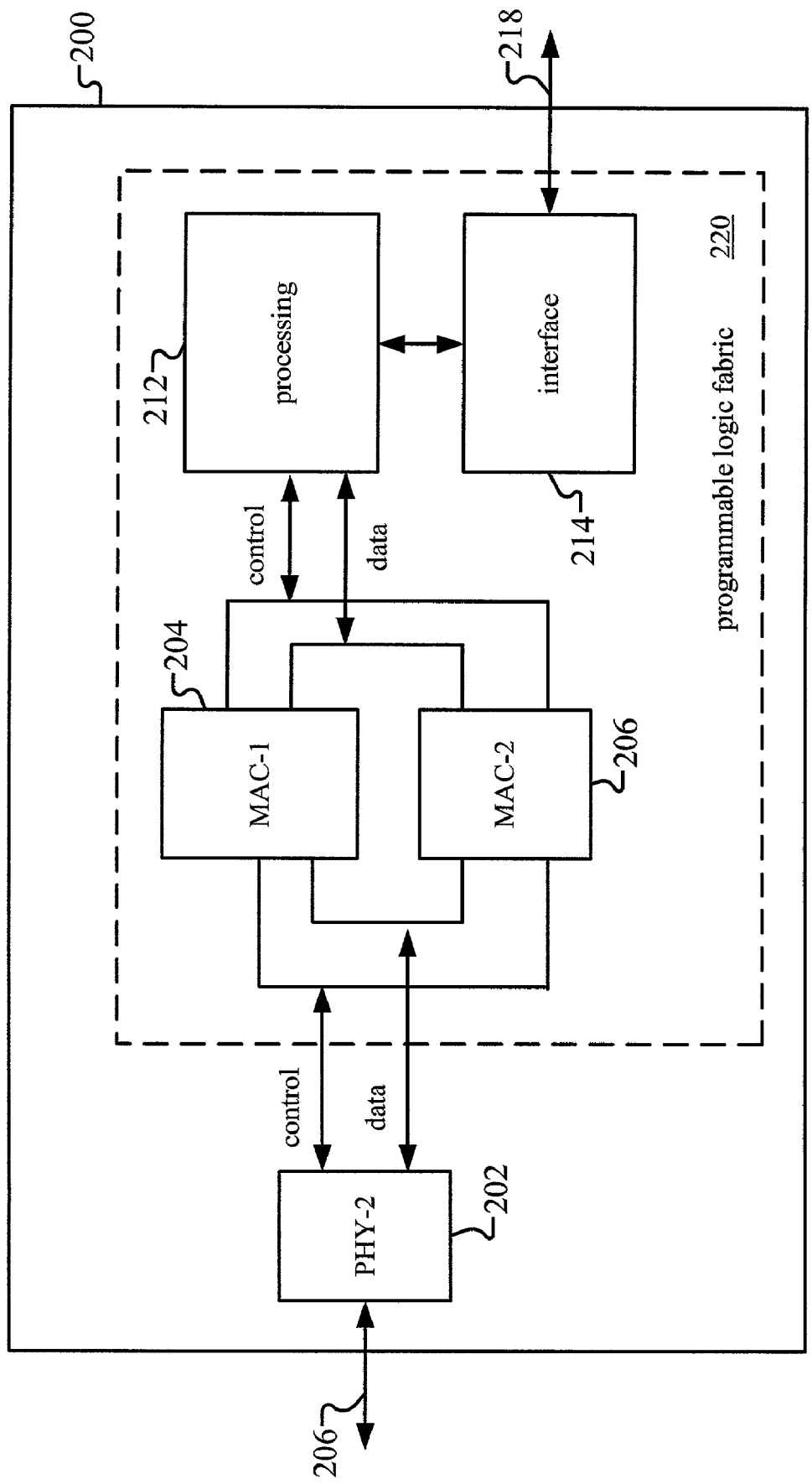
FIG. 4 is a block diagram of another exemplary embodiment of a communication integrated circuit in accordance with one or more aspects of the present invention.
Figure 5:
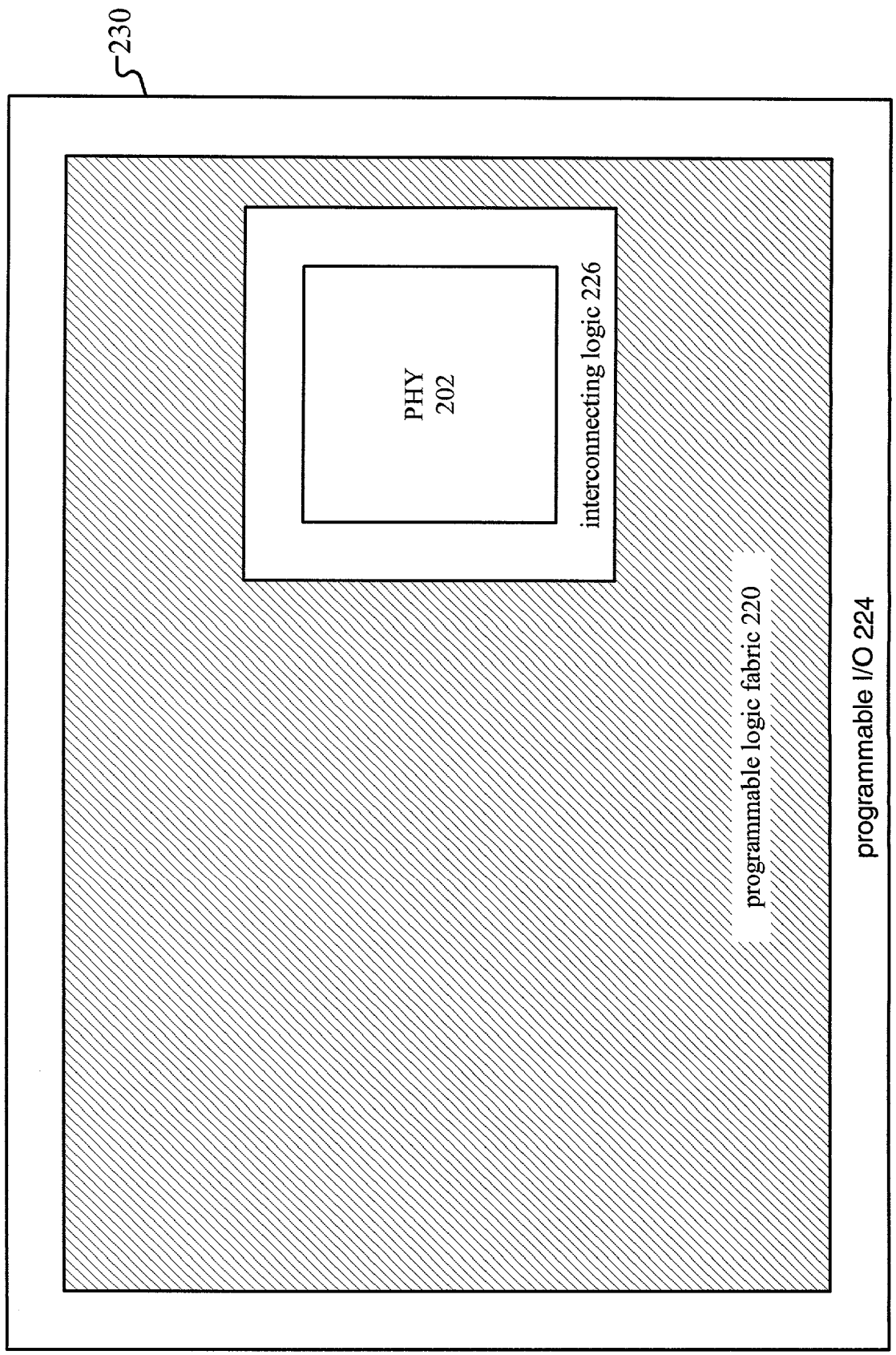
FIG. 5 is a block diagram of an exemplary embodiment of an FPGA that may be used to implement the communication circuit of FIG. 4 in accordance with one or more aspects of the present invention.

FIG. 5 shows an FPGA 230 that can be used to implement integrated circuit 200 of FIG. 4. Common elements of FIGS. 4 and 5 share common reference numerals. PHY 202 is placed inside programmable logic fabric 220. A connection logic layer 226 is used to provide transition from a fixed logic component to the programmable logic fabric. FPGA 230 also has a plurality of programmable IOBs 224. Some of the IOBs are used to carry signals 206 and 218 of FIG. 4.

Examples of specifications that can advantageously use the architecture shown in FIG. 4 are HiperLAN2, supported by HiperLAN2 Global Forum and IEEE 802.11a, supported by IEEE. These are wireless local area network specifications.

Figure 6:
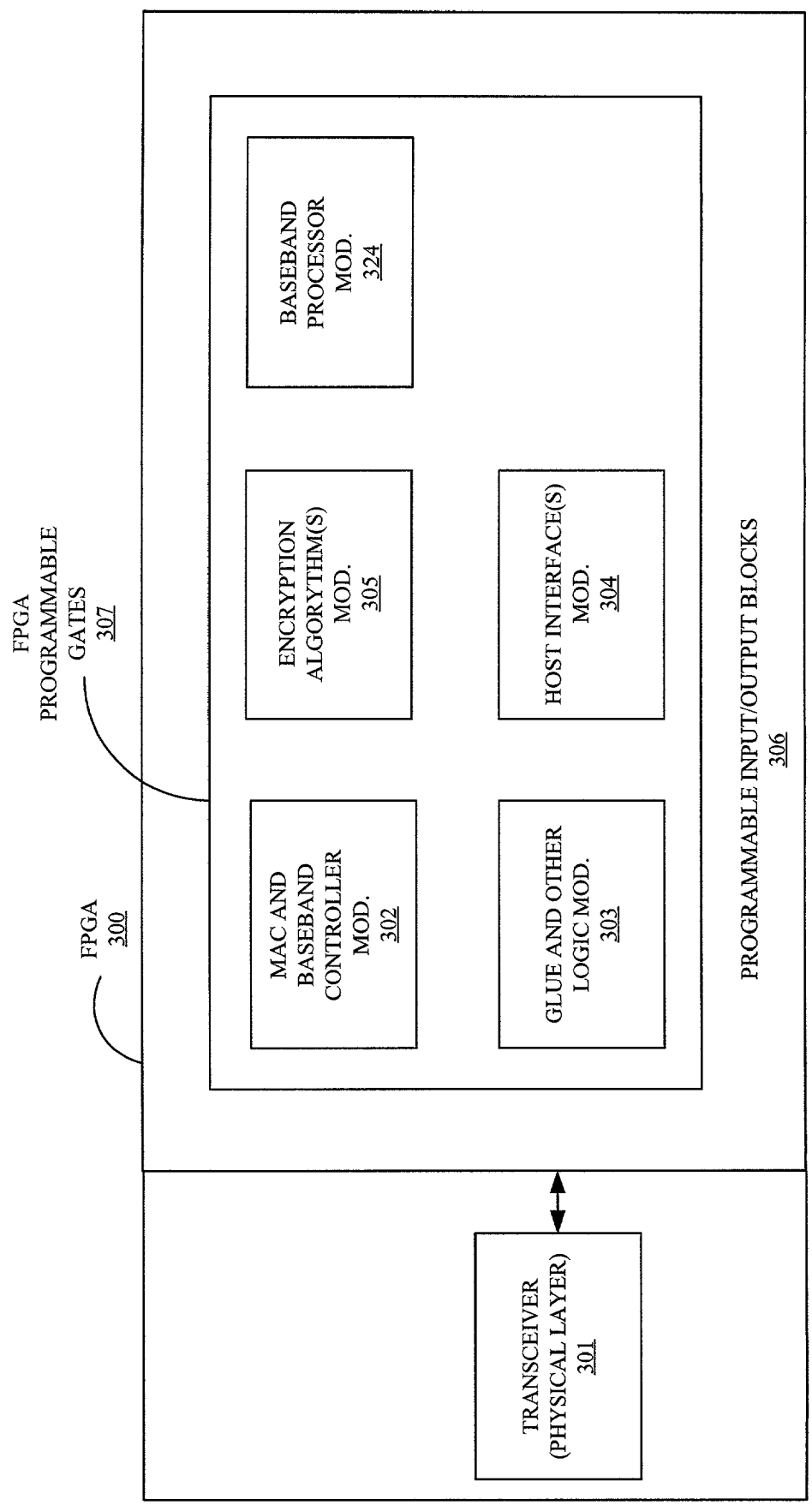
FIG. 6 is a block diagram of an exemplary portion of an embodiment of an FPGA in accordance with one or more aspects of the present invention.

Referring to FIG. 6, there is shown an exemplary embodiment of an FPGA 300 in accordance with one or more aspects of the present invention. FPGA 300 comprises programmable gates 307, programmable input/output (I/O) blocks 306 and transceiver (physical layer) 301. Transceiver 301 may be a 5 GHz radio for purposes of implementing IEEE 802.11a technology or HiperLAN2 technology. It should be understood that both IEEE 802.11a and HiperLAN2 use the same physical layer, and thus transceiver 301 may be used for both technologies. Transceiver 301 physical layer is therefore for Orthogonal Frequency Division Multiplex (OFDM) in accordance with the mentioned technologies. In order to achieve throughput necessary for operating a 5 GHz radio, transceiver 301 is hardwired or embedded, as opposed to having substantial functionality provided by programmable gates 307. Transceiver 301 is programmably coupled to programmable gates 307 through programmable I/O blocks 306. Programmable gates may be programmed to comprise several modules, namely medium access control and baseband controller module 302, encryption algorithms module 305, baseband processor module 324, and host interface(s) module 304, as well as glue and other logic module 303. Notably, a data link layer typically comprises a logical link control (LLC) sub-layer and a medium access control (MAC) sub-layer. However, for purposes of clarity, medium access control, as referred to with respect to module 302 is intended to cover MAC sub-layer, and may further comprise a portion of LLC sub-layer. More particularly, a framing portion conventionally done in an LLC sub-layer is done in a MAC sub-layer. Glue and other logic module 303 represent that programmable gates 307 may be used to provide glue logic or other desired logic functions, assuming sufficient gates 307 are available for programming. It further should be appreciated that MAC layers for IEEE 802.11a and HiperLAN2 technologies are significantly different. The MAC layer used for IEEE 802.11a is a Carrier Sense Multiple Access protocol, more particularly a Carrier Sense Multiple Access/Collision Avoidance (CSMA/CA), where the MAC layer for HiperLAN2 is Time Division Multiple Access (TDMA) protocol in conjunction with time division duplexing (TDD). Accordingly, MAC and baseband controller module 302 is programmed according to which technology platform is being employed.

Figure 7:
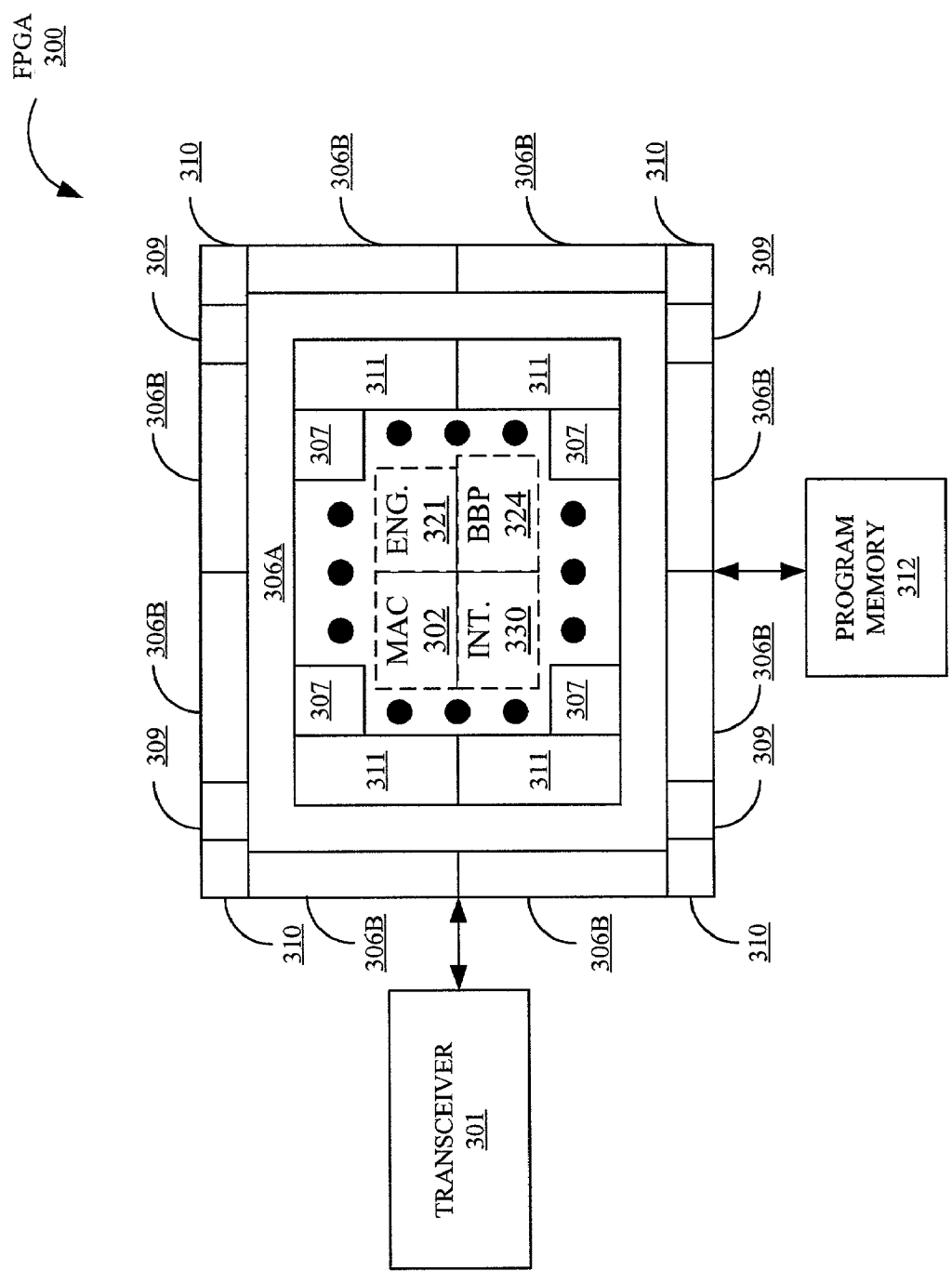
FIG. 7 is a block diagram of an exemplary portion of an FPGA configured with a MAC protocol and configuration controller and engine in accordance with one or more aspects of the present invention.

Referring to FIG. 7, there is shown an exemplary embodiment of FPGA 300 program in accordance with one or more aspects of the present invention. In this embodiment, a separate transceiver 301 integrated circuit, namely not embedded in FPGA 300, is coupled to FPGA 300, as is program memory 312. In this embodiment, a direct interface between separate transceiver 301 and FPGA 300 may be employed for direct interaction between transceiver 301 and FPGA 300. Program memory 312 stores programming instructions for configuring programmable gates 307, or more particularly configuration logic blocks 307. Program memory 312 and transceiver 301, whether embedded or separate from FPGA 300, are coupled to programmable gates 307 via programmable I/O blocks 306B, which are configurably coupled to I/O routing ring 306A. FPGA 300 comprises memory 311, which may be random access memory, for storing configuration information or configuring programmable gates 307. FPGA further comprises delay lock loops (DLLs) 309 and multiply/divide/de-skew clock circuits 310.

Programming instructions are used to configure memory 311 in order to provide one or more desired logical functions, namely, MAC 302, hosts interface 330, encryption engine 321, or baseband processor 324. It should be noted that HiperLAN2 and IEEE 802.11a technologies use different baseband controllers, and this particular baseband controller will need to be programmed into FPGA 300 depending on the technology platform employed. Thus, to this point, it should be appreciated that FPGA 300 provides a multi-platform Application Specific Standard Product (ASSP).

Figure 8:
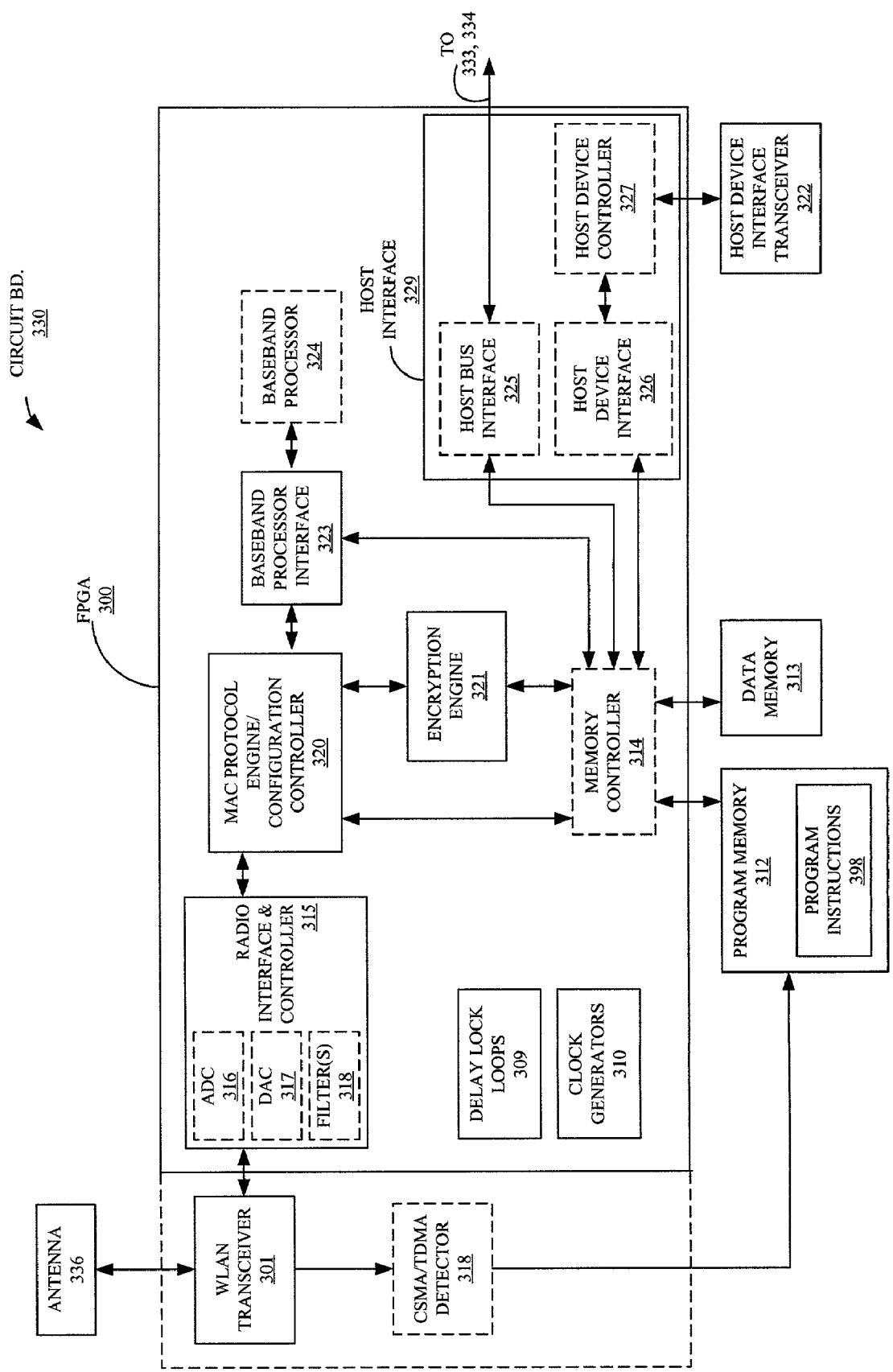
FIG. 8 is a network diagram of an exemplary portion of an implementation of an FPGA in accordance with one or more aspects of the present invention.

Referring to FIG. 8, there is shown an exemplary embodiment of a circuit board 330 comprising an FPGA 300 in accordance with one or more aspects of the present invention. Circuit board 330 comprises FPGA 300, program memory 312, and data memory 313. Additionally, circuit board 330 may comprise an interconnect for connecting to a host bus, for example, a host bus of computers 333 or access points 334. Alternatively, or in addition to, such a connector, circuit board 330 may comprise a host device interface transceiver 322. Moreover, circuit board 330 may comprise antenna 336 or may be coupled to antenna 336.

Wireless local area network transceiver 301 receives information from or provides information to antenna 336. The receive signal will be in an OFDM form, as mentioned above, however the MAC layer will be CSMA or TDMA. Accordingly, a CSMA/TDMA detector 318 may be coupled to wireless LAN transceiver 301 to provide an indicator signal to memory 312, indicative of whether a received signal is a CSMA or TDMA signal. FPGA 300 may have embedded wireless transceiver 301 and optionally embedded CSMA/TDMA detector 318. Because of the time necessary to program FPGA 300, using an auto detect signal from detector 318 to program memory 312 would be for an initialization or setup operation. Alternatively, CSMA/TDMA detector 318 may be omitted and FPGA 300 may be programmed via a host bus or host device for selecting program instructions 398 stored in program memory 312 to program FPGA 300 for CSMA or TDMA MAC layers and appropriate baseband controllers.

FPGA 300 is programmed by program instructions 398 contained in program memory 312. Thus, once FPGA 300 is configured, it may communicate with transceiver 301.

Configured FPGA 300 comprises radio interface and controller 315, MAC protocol engine/configuration controller 320, baseband processor interface 323, and optionally encryption engine 321. Radio interface and controller 315 may comprise analog-to-digital converter (ADC) 316, digital-to-analog converter (DAC) 317 and baseband filters 318. Alternatively, as circuit board 330 is directed at providing a 5 GHz WLAN radio implementation, ADC 318, DAC 317 and filters 318 may be embedded or otherwise hardwired for processing signals from WLAN transceiver 301, as opposed to being programmed as part of radio interfacing controller 315 using programmable gates of FPGA 300.

Radio interface controller 315 is in communication with MAC protocol engine/configured controller 320. MAC protocol engine/configuration 320 is in communication with baseband processor interface 323, encryption engine 321 and memory controller 314. Memory controller 314 is in communication encryption engine 321, baseband processor interface 323, program memory 312 and host interface 329. Memory controller 314 may be programmed using a portion of program instruction 398 for programming programmable gates of FPGA 300 or may be hardwired or embedded with FPGA 300, or may be a separate integrated circuit from FPGA 300. Advantageously, using programmable gates of FPGA 300 a memory controller 314 facilitates support of various types of memory. For example, static random access memory (SRAM) may be configured for ZBT, DDR, and QDR, among other formats, dynamic random access memory may be configured for page mode, synchronous, and synchronous DDR, among other formats. Memory controller 314 may be coupled to separate data memory 313 for use by FPGA 300 in processing information received from or provided to WLAN transceiver 301, computer 333, access point 334 or host device interface receiver 322. MAC protocol engine/configuration controller 320 is in communication baseband processor interface 323. Baseband processor interface 323 is in communication with memory controller 314 and baseband processor 324. Baseband processor 324 may be programmed with programmable gates of FPGA 300, or be provided in an embedded or otherwise hardwired form with FPGA 300 or provided as a separate integrated circuit from FPGA 300.

Encryption engine 321 may be an implementation of any of a variety of encryption algorithms. Conventionally, in the wireless space, a Wired Equivalent Privacy (WEP) encryption is used. Notably, WEP is only for wireless communication and not necessarily for end-to-end communication. An algorithm for plain text data (RC4) encryption is used, and to protect against unauthorized data modification a redundancy code, namely CRC-32, is used. However, 40 bit RC4 encryption is used for IEEE 802.11a, it is not used for HiperLAN2. Accordingly, program memory 312 comprises programming instructions 398 for FPGA 300 to configure encryption engine 321 for either of at least these two types of encryptions being employed, namely, RC4 and DES or triple DES with respect to HiperLAN2. Moreover, there is no particular reason that only these encryption algorithms may be a programmed in FPGA 300, and thus program memory 312 may comprise program instructions 398 for FPGA 300 for other encryption algorithms including but not limited to Advanced Encryption Standard (AES), Rivest-Shamir-Adleman (RSA), Diffie-Hellman, RC4/RC5, Secure Hashing Algorithm (SHA), Blowfish, Elliptic Curve Encryption, El Gamal, and Lucas Sequence (LUC), among others.

Memory controller 314 is communication with host interface 329. Host interface 329 may comprise host bus interface 325, host device interface 326, and host device controller 327. Additionally, host interface 329 may comprise an embedded or hardwired host device interface transceiver 322, which is embedded or hardwired with FPGA 300. Host bus interface 325 is in communication with memory controller 314 and may be put in communication with a bus of computer 333 or access point 334. Host device interface 326 is in communication with memory controller 314 and host device controller 327. Host device controller 327 is in communication with host device interface transceiver 322. Host interface 329 is described in more detail herein below for providing a plurality interface platforms with FPGA 300.

Figure 9:
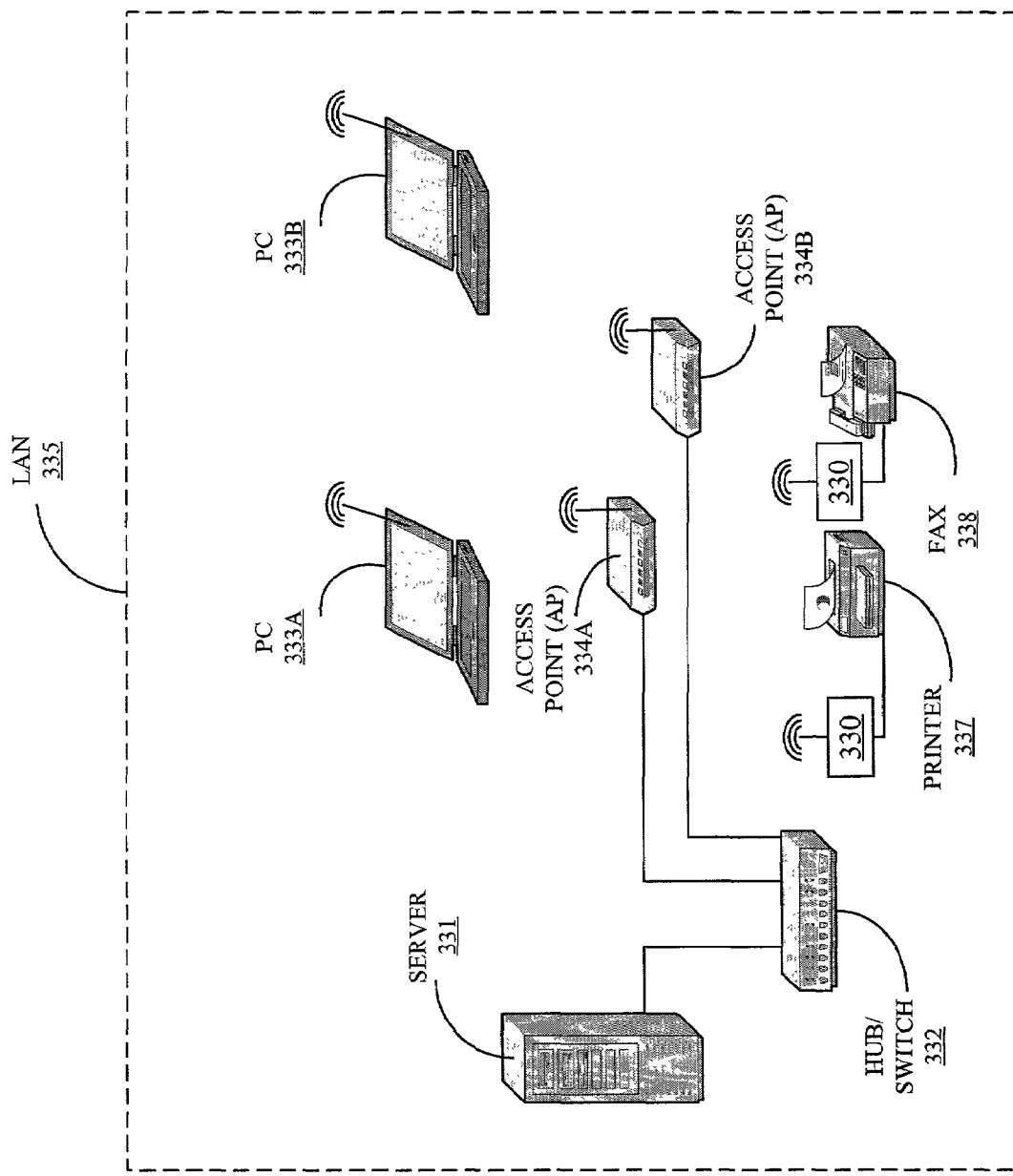
FIG. 9 is a block diagram of an exemplary portion of an FPGA architecture in accordance with one or more aspects of the present invention.

Referring to FIG. 9, there is shown a network diagram of an exemplary embodiment of a WLAN in accordance with one or more aspects of the present invention. Local area network 335 comprises server 331 coupled to hub or switch 332 coupled to access points (AP) 334A and 334B, as well as personal computer 333A and 333B. Access points 334 and personal computers 333 are equipped with respective circuit boards 330. Notably, computer 333A and access point 334A may be configured for IEEE 802.11a technology, and computer 333B and access point 334B may be configured for HiperLAN2 technology, even though computers 333 and access points 334 use the same interface card namely circuit board 330. Notably, circuit board 330 may be implemented in a wireless printer 337, a wireless fax 338, among other well-known peripheral devices for inclusion in local area network 335. However, rather than installing a WLAN interface card in accordance with circuit board 330 in printer 337 or fax 338 a separate WLAN interface may be used, such as an universal serial bus (USB) interface between circuit board 330, or more particularly, host device interface transceivers 332, and a peripheral device or computer.

Figure 10:
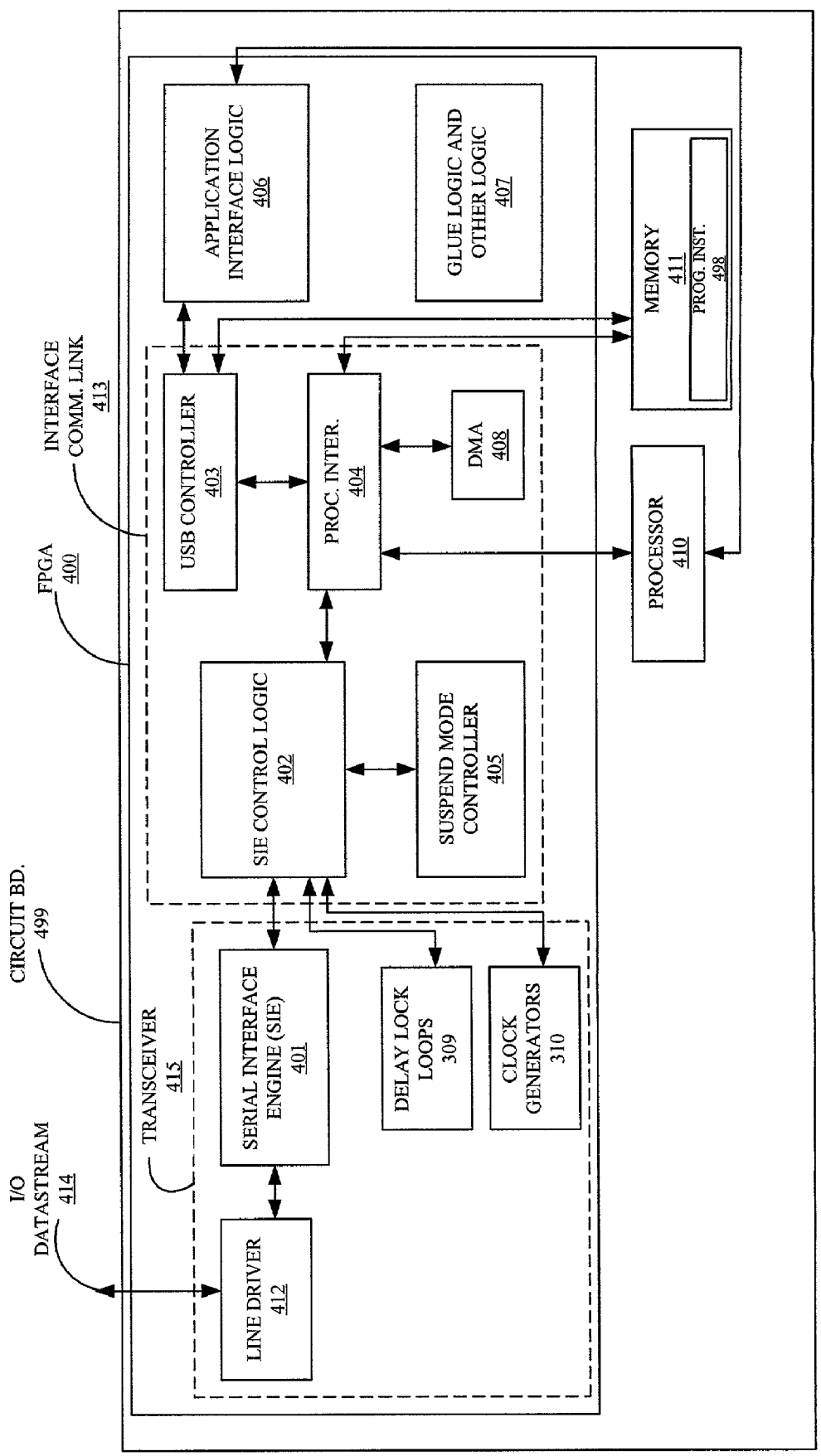
FIG. 10 is a block diagram of an exemplary embodiment of a portion of an Application Specific Standard Product (ASSP) in accordance with one or more aspects of the present invention.

Referring to FIG. 10, there is shown a block diagram of an exemplary embodiment of an FPGA 400 coupled to processor 410 and memory 411 which may be assembled to a circuit board 499 in accordance with one or more aspects of the present invention. As will become apparent, FPGA 300 of FIG. 8 may be configured to incorporate interface functionality described with respect to FPGA 400. Memory 411 stores programming instructions 498 for configuring FPGA 400. FPGA 400 comprises interface transceiver 415, interface communication link 413, application interface logic 406 and glue logic and other logic functions 407. I/O data stream 414 is a USB compliant data stream. More particularly, I/O data stream 414 may be a USB 2.0 compliant data stream. Data stream 414 is provided to line driver 412. Line driver 412 is in communication with serial interface engine (SIE) 401. Notably, transceiver 415 comprises line driver 412, SIE 401, one or more delay lock loops 309, and one or more clock generators 310. Transceiver 415 is part of the physical layer, and accordingly may be hardwired or otherwise embedded with respect to formation of FPGA 400. Alternatively, transceiver 415 may be made separate from FPGA 400, namely, two separate integrated circuits.

SIE 401 is in communication with SIE control logic 402. SIE control logic 402 is in communication with delay lock loops 309, clock generators 310, suspend mode controller 405 and processor interface 404. Processor interface 404 may be a parallel interface module (PIM), as is known for a USB interface core. Processor interface 404 is in communication with direct memory address (DMA) 408 and controller 403. Accordingly, controller 403 may be a USB controller, and more particularly a USB 2.0 compatible controller. Interface communication link 413 comprises SIE control logic 402, suspend mode controller 405, USB controller 403, processor interface 404 and DMA 408. Interface communication link 413 is configured using FPGA 400 programmable gates. In this manner, FPGA 400 may be programmed, and therefore reprogrammed. Interface communication link 413 is programmed with a portion of instructions 498 stored in memory 411. Stored in memory 411 is a plurality of interface communication link instructions 498 for selection of a configuration for programming FPGA 400.

USB controller 403 is in communication with application interface logic 406 and memory 411. Application interface logic 406 is configured using programmable logic gates of FPGA 400. Accordingly, application interface logic 406 may be programmed with one of multiple interfaces stored in memory 411 as a portion of programming instructions 498. Examples of such interfaces include Ethernet, Peripheral Component Interconnect (PCI), Controller Area Network (CAN), WLAN, HomeRF, PCI-X, Video Electronics Standards Association (VESA), Infiniband, RapidIO and Universal Asynchronous Receiver Transmitter (UART), among others. With respect to additional available gates for programming in FPGA 400, glue and other logic 407 is available. Processor 410 is in communication with processor interface 404 and application interface logic 406. Memory 411 is in communication with processor interface 404 and USB controller 403. Processor interface 404 is a selected one of a plurality of processor interface configurations stored in memory 411 as a portion of programming instructions 498. Thus, processor 410 may be any of a variety of known processor architectures, such as a Complex Instruction-Set Computer (CISC) processor architecture and a Reduced Instruction-Set Computer (RISC) processor architecture. Notably, USB controller 403 alternatively may be part of the physical layer and thus formed integral with FPGA 400 through a hardwired or embedded configuration, or formed as a separate integrated circuit. Accordingly, memory 411 comprises programming instructions 498 for configuring programmable gates of FPGA 400 as described above.

I/O data stream 414 is a USB data stream. However, application interface logic 406 may be other than USB. Accordingly, application interface logic 406 is configured to take input from processor 410 and convert it into a USB format, and application interface logic 406 is configured to receive USB formatted information from USB controller 403 and convert it into an application interface format used by processor 410. Thus, FPGA 400 may be configured to provide an interface that is a multi-platform ASSP.

USB is a growing trend with respect to high-speed communication technology. USB is incorporated into printers, scanners, monitors, digital speakers, digital cameras, digital modems, stand alone hubs, external storage drives, digital TV, monitors, and gaming consoles, computers, set-top boxes, SOHO routers, home gateway, home servers, among other consumer electronic devices.

It can be seen from the above description that a novel communication system architecture has been disclosed. Those having skill in the relevant arts of the invention will now perceive various modifications and additions, which may be made as a result of the disclosure herein. Accordingly, all such modifications and additions are deemed to be within the scope of the invention, which is to be limited only by the appended claims and their equivalents.

While foregoing is directed to the preferred embodiment of the present invention, other and further embodiments of the invention may be devised without departing from the basic scope thereof, and the scope thereof is determined by the claims that follow.

The invention claimed is:

1. A subsystem for use in a wireless local area networking device, comprising:
   a transceiver;
   programmable gates coupled to the transceiver;
   memory coupled to the programmable gates, the memory storing instructions for programming a first portion of the programmable gates as a selected one of a first type of medium access layer and a second type of medium access layer, the first type of medium access layer different from the second type of medium access layer, wherein the first type of medium access layer and the second type of medium access layer are compatible with the transceiver, the memory storing instructions for programming a second portion of the programmable gates as a baseband controller;
   the transceiver being coupled to the programmable gates through programmable input/output blocks;
   the transceiver and the programmable gates being formed as an integrated circuit; and
   the first type of medium access layer and the second type of medium access layer having a common access to the transceiver.

2. The subsystem of claim 1 wherein the first type of medium access layer comprises a Carrier Sense Multiple Access protocol, and the second type of medium access layer comprises a Time Division Multiple Access protocol.

3. The subsystem of claim 1 wherein the integrated circuit is a Field Programmable Gate Array.

4. The subsystem of claim 1 wherein the memory stores instructions for programming a third portion of the programmable gates as a baseband processor.

5. A subsystem for use in a wireless local area network device, comprising:
   a transceiver;
   programmable gates coupled to the transceiver;
   memory coupled to the programmable gates, the memory storing instructions for programming a first portion of the programmable gates with a selected one of a first data-link layer and a second data-link layer, the first data-link layer different from the second data-link layer, wherein the first data-link layer and the second data-link layer are compatible with the transceiver, the memory storing instruction for programming a second portion of the programmable gates with a baseband controller;
   the transceiver, the programmable input/output blocks, and the programmable gates being formed as an integrated circuit; and
   the first data-link layer and the second data-link layer having a common access to the transceiver.

6. The subsystem of claim 5 further comprising a baseband processor coupled to the programmable gates.

7. The subsystem of claim 6 wherein the transceiver and the baseband processor are coupled to the programmable gates through programmable input/output blocks.

8. The subsystem of claim 7 wherein the first data-link layer comprises a first logical link control sub-layer and a first medium access control sub-layer, and the second data-link layer comprises a second logical link control sub-layer and a second medium access control sub-layer.

9. The subsystem of claim 8 wherein the first medium access control sub-layer comprises a Carrier Sense Multiple Access protocol, and the second medium access control sub-layer comprises a Time Division Multiple Access protocol.

10. A circuit board, comprising:
    a field programmable gate array comprising programmable configuration logic blocks and programmable input/output blocks coupled to the programmable configuration logic blocks;
    a radio coupled to the programmable configuration logic blocks through the programmable input/output blocks;
    program memory coupled to the programmable configuration logic blocks through the programmable input/output blocks;
    data memory coupled to the programmable configuration logic blocks through the programmable input/output blocks; and
    an interface transceiver coupled to the programmable configuration logic blocks through the programmable input/output blocks;
    the program memory comprising programming instructions for the programmable configuration logic blocks to be configured as, a radio interface and controller;

a medium access control protocol engine and configuration controller; and a baseband processor interface.

11. The circuit board of claim 10 wherein the program memory comprises programming instruction for the programmable configuration logic blocks to be configured as a baseband processor.

12. The circuit board of claim 10 wherein the program memory comprises programming instruction for the programmable configuration logic blocks to be configured as an encryption engine.

13. The circuit board of claim 10 wherein the program memory comprises programming instruction for the programmable configuration logic blocks to be configured as a memory controller and host bus interface.

14. The circuit board of claim 10 wherein the program memory comprises programming instruction for the programmable configuration logic blocks to be configured as a memory controller, host device interface and host device controller.

15. The circuit board of claim 14 wherein the host device interface and the host device controller are user selectable.

* * * * *